United States Patent [19]
Harris

[11] Patent Number: 5,309,272
[45] Date of Patent: May 3, 1994

[54] DUAL PASS BINARY DIFFRACTIVE OPTICAL ELEMENT SCANNER

[75] Inventor: Ellis D. Harris, Claremont, Calif.

[73] Assignee: Xerox Corporation, Stamford, Conn.

[21] Appl. No.: 989,320

[22] Filed: Dec. 11, 1992

[51] Int. Cl.$^5$ .................. G02B 26/08; G02B 5/32
[52] U.S. Cl. .................. 359/196; 359/18; 359/565; 359/569; 235/457
[58] Field of Search .......... 359/17, 18, 209, 565, 359/566, 569, 572, 732, 234, 232, 210; 235/457, 462

[56] References Cited

U.S. PATENT DOCUMENTS

| | | | |
|---|---|---|---|
| 3,619,033 | 11/1971 | McMahon | 359/565 |
| 4,289,371 | 9/1981 | Kramer | 359/569 |
| 4,333,006 | 6/1982 | Gorin et al. | 359/18 |
| 4,415,224 | 11/1983 | Dickson | 359/18 |
| 4,548,463 | 10/1985 | Cato et al. | 359/18 |
| 4,626,062 | 12/1986 | Ishikawa | 359/18 |
| 4,632,499 | 12/1986 | Noguchi et al. | 359/17 |
| 4,678,263 | 7/1987 | Funato | 359/18 |
| 4,758,058 | 7/1988 | Cato et al. | 359/18 |
| 4,810,046 | 3/1989 | Yamagishi et al. | 359/18 |
| 4,895,790 | 1/1990 | Swanson et al. | 430/321 |
| 5,064,258 | 11/1991 | Inokuchi et al. | 359/17 |
| 5,073,007 | 12/1991 | Kedmi et al. | 359/565 |
| 5,091,798 | 2/1992 | Hibino | 359/209 |
| 5,258,862 | 11/1993 | Harris | 359/17 |

OTHER PUBLICATIONS

W. Veldkamp & T. McHugh, "Binary Optics", *Scientific American*, vol. 266, No. 5, May 1992, pp. 92-97.

G. J. Swanson, "Binary Optics Technology: The Theory and Design of Multi-Level Diffractive Optical Elements", Lincoln Laboratory, Massachusetts Institute of Technology, *Technical Report* 854, Aug. 14, 1989.

*Primary Examiner*—Loha Ben
*Attorney, Agent, or Firm*—William Propp

[57] ABSTRACT

An optical scanning system uses a double pass of a light beam through two rotating binary diffractive optical elements on a disc to focus a scan beam at a scan line and to scan the beam along the scan line which doubles the scan angle of the beam.

16 Claims, 3 Drawing Sheets

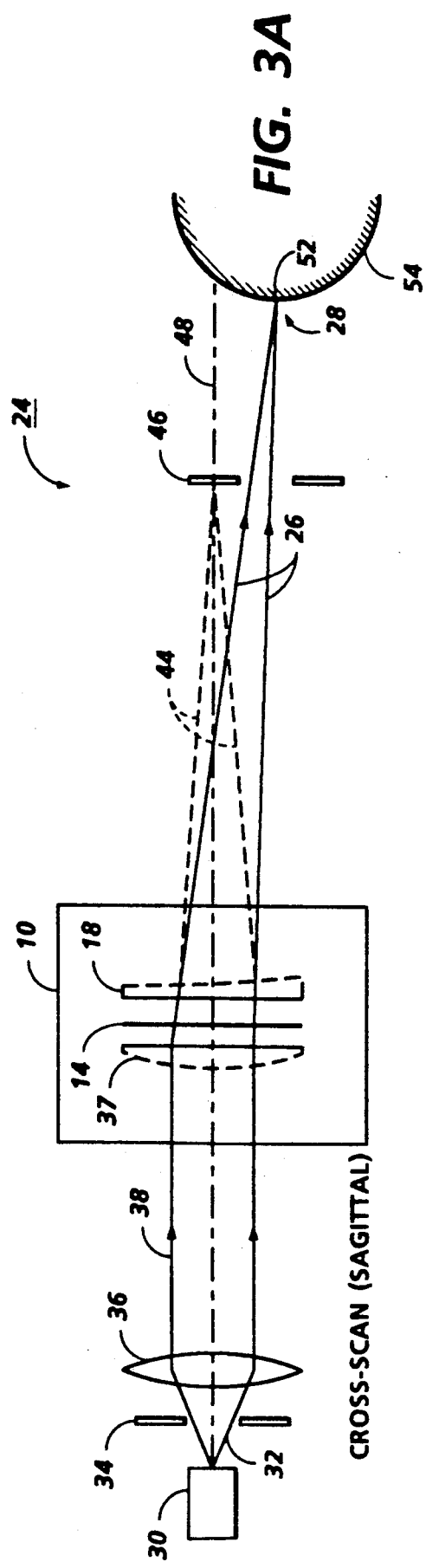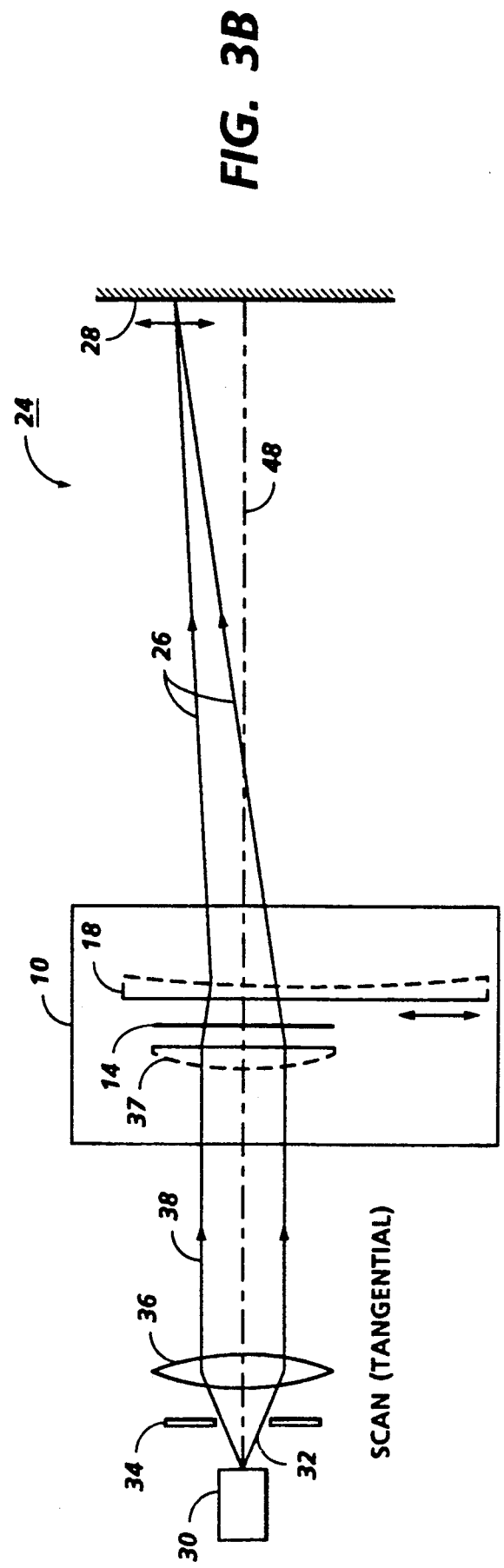

DUAL PASS BINARY DIFFRACTIVE OPTICAL ELEMENT SCANNER

BACKGROUND OF THE INVENTION

This invention relates to an optical scanner, and, more particularly, to an optical scanner with a dual pass, single binary diffractive optical element used to scan a beam along a line.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, diffractive phase elements can achieve 100 percent diffraction efficiency at a given wavelength. To achieve this efficiency, however, a continuous phase profile is necessary. The theoretical diffraction efficiency of this surface profile is also relatively sensitive to a change in wavelength. By contrast, refractive elements are wavelength insensitive. The technology for producing high quality, high efficiency, continuous phase profiles does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, Aug. 14, 1989) and the resulting U.S. Pat. No. 4,895,790, a fabrication process for a binary diffractive optical element or multi-level phase profile diffraction grating starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material is coated with a thin layer of photoresist. The lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process is repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process is repeated a third and fourth time with lithographic masks having periods of one-quarter and one-eighth that of the first mask, and etching the substrates to depths of one-quarter and one-eighth that of the first etch. The successive etches result in elements having 8 and 16 phase levels.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. This mask and etch fabrication process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

The photolithographic etch steps can be done in any order. Alternatively, the highest pitch, shallowest level is processed first since this level is more difficult to control if etched following deeper etches.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Optical scanning systems are used to scan a spot of light along a predetermined pattern such as a scan line on a photoreceptor. A reflective optical scanning system would be a rotating polygon mirror scanner known to those of ordinary skill in the art. However, even a reflective optical scanning system still requires additional optical components, usually refractive lenses and other reflective mirrors both before the rotating polygon mirror and after the rotating polygon mirror to be able to scan a beam of light across the scan line.

Many systems have been disclosed in the art to overcome various optical and other distortions caused by rotating polygon mirror optical scanners. Bow is defined as an error in the optical scanning system caused by the beam not being exactly horizontal prior to striking the facet. The scan line deviates from a straight line and is bowed in the middle of the scan line. Wobble is caused by the facet not being exactly parallel to the vertical axis, thereby angling the beam reflected from the facet up or down a small amount.

A rotating hologram would be a diffractive optical scanning system and is known to those of ordinary skill in the art. However, even a holographic optical scanning system still requires additional optical components, usually refractive lenses and other reflective mirrors both before the rotating hologram and after the rotating hologram to be able to scan a beam of light across the scan line.

Rotating a polygon mirror or a hologram requires a number of additional optical components which reduces the net optical beam throughput and increases the size and cost of the optical scanning system.

It requires a significant amount of drive power and bearing load to rotate a polygon mirror. Consistent high speeds needed for faster and more scans present problems.

Wobble and shaft mounting errors are always a problem when rotating a thick, heavy, aerodynamically resistant structure such as a polygon mirror.

It is an object of this invention to provide an optical scanning system using binary diffractive optical elements.

It is another object of this invention to provide an optical scanning system with a reduced number of optical components and no optical components after the scanning element.

It is still another object of this invention to provide a dual pass, single binary optical element used as the scanning element in an optical scanning system.

SUMMARY OF THE INVENTION

In accordance with the present invention, an optical scanning system uses a double pass of a light beam through two rotating binary diffractive optical elements on a disc to focus a scan beam at a scan line and to scan the beam along the scan line which doubles the scan angle of the beam. A light source, a collimating lens and a stationary binary diffractive optical element provide the incident beam for the two binary diffractive optical elements. The scanning beam is the first order diffracted beam and a stop blocks the zero order, nondiffracted beam and the other higher diffraction orders. Alternately, the use of the second order diffracted beam as the scanning beam doubles the scan angle again.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 3A and 3B are schematic illustrations of the incident and scanning beams in the scan and cross-scan planes passing through the optical scanning system of FIG. 2.

DESCRIPTION OF THE PREFERRED EMBODIMENT

Figure 1:
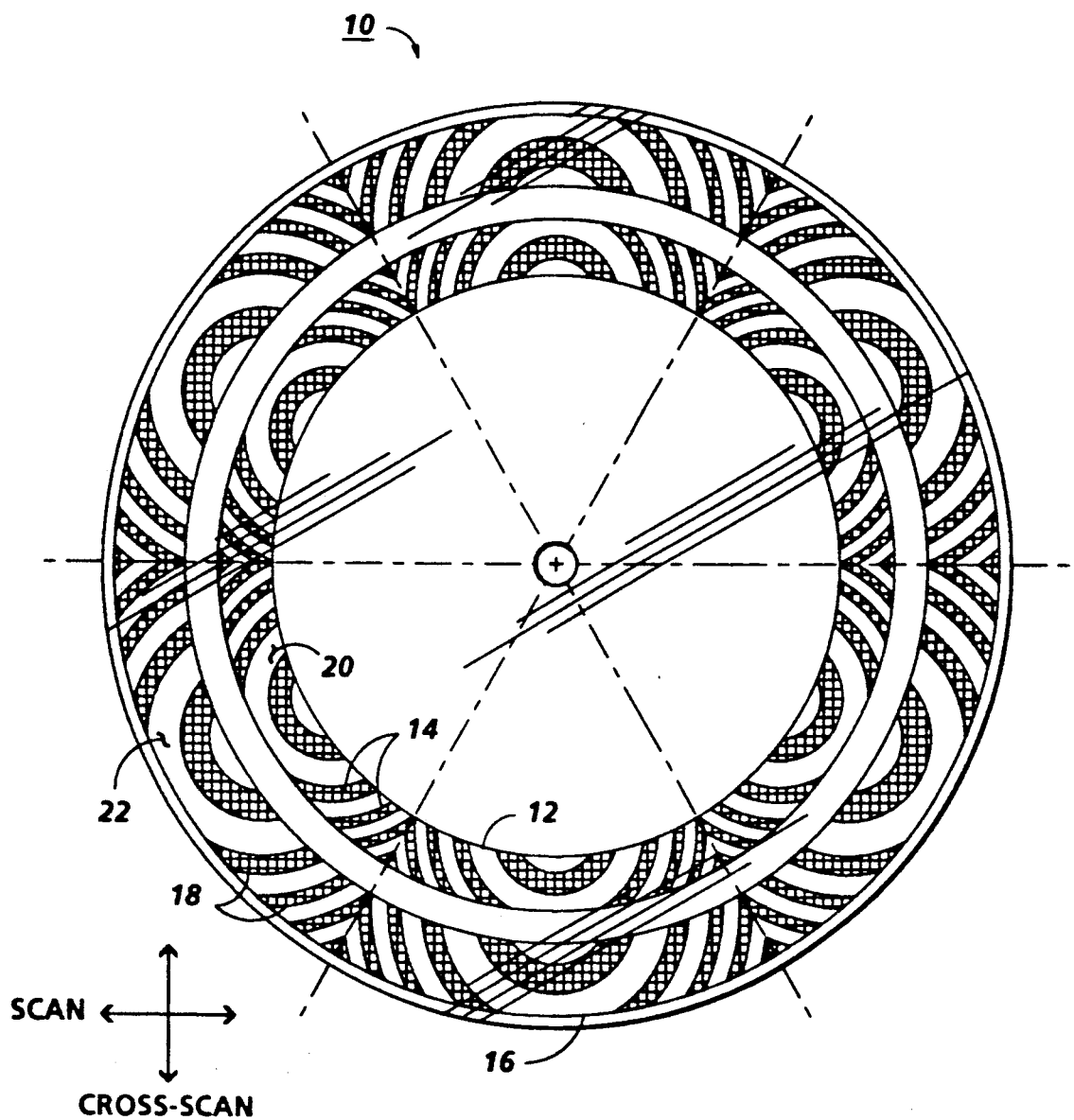
FIG. 1 is a schematic illustration of the dual pass, single binary diffractive optical element disc for an optical scanner formed according to the present invention.

Reference is now made to FIG. 1, wherein there is illustrated a rotatable transparent disc 10 which has a first inner ring 12 with a first plurality of binary diffractive optical elements 14 circumferentially in annular sectors around the disc and a second outer ring 16 with a second plurality of binary diffractive optical elements 18 circumferentially in annular sectors around the disc. Each binary diffractive optical element 14 in the inner ring 12 has a corresponding binary diffractive optical element 18 in the outer ring 16.

The inner ring 12 has a smaller radius than the outer ring 16. The first plurality of binary diffractive optical elements 14 and the second plurality of binary diffractive optical elements 18 will together generate a repetitive single scan line.

The binary diffractive optical element pattern 20 in each element 14 repeats itself as the scanning beam repeatedly scans across the scan line just as the corresponding binary diffractive optical element pattern 22 in each element 18 repeats itself as the scanning beam repeatedly scans across the scan line.

The multilevel phase relief structure 20 of the binary diffractive optical element 14 is along a radius of the rotating disc and is essentially parallel to the cross-scan (sagittal) plane and diffract light into the scan (tangential) plane. The multilevel phase relief structure 22 of the binary diffractive optical element 18 is along the radius of the rotating disc and is also essentially parallel to the cross-scan (sagittal) plane and also diffract light into the scan (tangential) plane.

Figure 2:
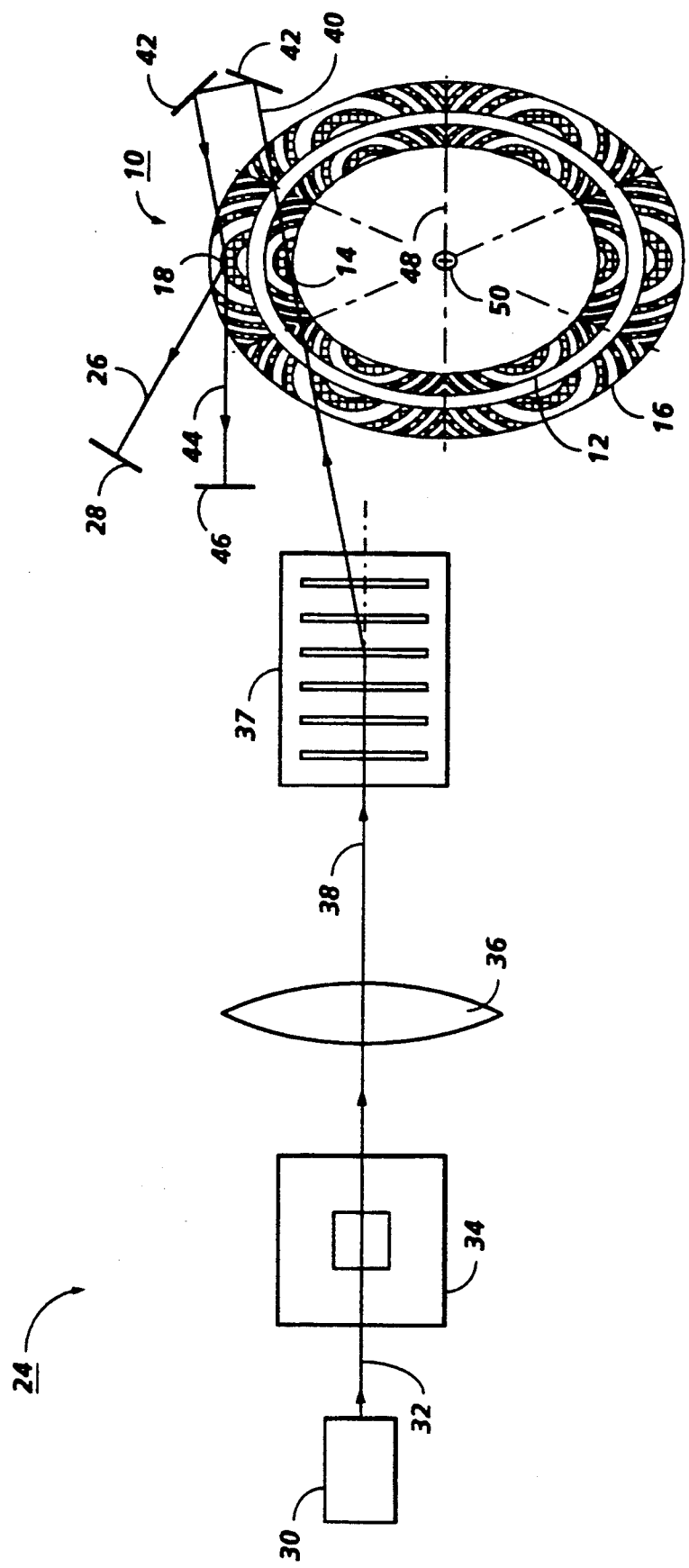
FIG. 2 is a schematic illustration of the optical scanning system using a rotating dual pass binary diffractive optical element disc formed according to the present invention.

The optical scanning system 24 of FIG. 2 which scans a light beam 26 across a scan line 28 has a light source 30 which emits a coherent light beam 32. The coherent light beam 32 propagates through a beam control aperture 34, is collimated by collimating lens 36 and is conditioned by stationary binary diffractive optical element 37. The BDO element 37 provides the primary optical conditioning in both the scan (tangential) and cross-scan (sagittal) planes for the scanning beam (the first order diffracted beam). The stationary binary diffractive optical element need not be a disc.

The nature of binary diffractive optics technology allows multiple optical functions to be incorporated in each binary diffractive optical element enabling compensation and correction as required.

The light beam 26 diffracted by the rotating binary diffractive optical elements 14 and 18 from the beam axis in the scan (tangential) plane will experience a cross-scan (sagittal) component in this diffraction. This can be calculated and corrected earlier in the optical path by the stationary binary diffractive optical element 37.

As shown in FIG. 1, the pitch or distance between adjacent binary diffractive optical elements 14 and 18 is smaller nearer the center of rotation of the rotating binary diffractive optical element resulting in a larger angle of diffraction. This effect can be calculated and corrected earlier in the optical path by the stationary binary diffractive optical element 37.

The resulting collimated beam 38, diffracted and consequently conditioned by the stationary first binary diffractive optical element 37, is then incident upon the first plurality of binary diffractive optical elements 14 of the inner ring 12 of the rotating disc 10. The resulting diffracted beam 40 is reflected by folding mirrors 42 and incident upon the second plurality of binary diffractive optical elements 18 of the outer ring 16 of the rotating disc 10. The resulting diffracted beam 26 is scanned across the scan line 28. The zero order and all other undesirable higher order diffraction light beam 44 from the binary diffractive optical elements will be blocked by a stop 46. The first and second plurality of binary diffractive optical elements 14 and 18 focus and scan the diffracted beam across the scan line. The dual pass through the rotating binary diffractive optical elements doubles the scan angle obtainable by the optical scanning system.

FIG. 3 shows the optical path through the binary diffractive optical element, dual pass optical scanning system 24 in the scan and cross-scan planes. With reference to FIGS. 2 and 3, the light source 30, such as a visible light diode laser, emits a coherent light beam 32 of a single wavelength.

The light beam 32 then propagates through a beam control aperture 34 which may block portions of the beam. The beam control aperture reduces the effects of angular beam spread from the light source 30. The light beam is then collimated by a collimating lens 36 such as a molded glass aspherical collimating lens. Due to the beam spread difference in the scan and cross-scan planes, the collimated beam cross-section cannot be circular with a symmetric collimator lens. The larger beam diameter should be in the scan (tangential) plane allowing the scan spot size to be small. The spot grows in this axis due to motion blur.

The optical scanning system 24 is based on a single element 10 with two multi-functional rotating binary diffractive optical elements 14 and 18 and stationary conditioning binary diffractive optical element 37. The rotating binary diffractive element 14 precedes the rotating binary diffractive optical elements 18. Together these three binary diffractive optical elements focus an incident collimated beam at the scan line and scan the resulting spot over the scan line. The three binary diffractive optical elements also correct for optical aberrations in the beam.

The collimated, still coherent beam 38 is then incident upon the first binary diffractive optical elements 14 of the rotating disc 10. The two BDO elements 14 and 18 provide the primary optical focussing in both the scan (tangential) and cross-scan (sagittal) planes for the scanning beam (the first order diffracted beam). The binary diffractive optical elements 14 and 18 are underfilled in that the incident beam's cross-section is considerably smaller than the binary diffractive optical elements 14 and 18.

The incident light beam 38 typically has a normal or perpendicular angle of incidence to the binary diffractive optical elements 14 and 18 on the rotating binary diffractive optical element disc 10. The incident beam can be at the Bragg angle of incidence to reduce loss at the beam strikes the front surface of the rotating binary diffractive optical element disc. The incident beam can, however, have any angle of incidence to the rotating binary diffractive optical element disc.

The disc 10 is rotatable about an axis of rotation 48. The rotating disc is driven at a constant speed by a motor (not shown) coupled to the rotor 50 along the axis of rotation of the disc.

The resulting focussed diffracted beam 40 from the rotating first binary diffractive optical elements 14 is the first order diffraction beam. The beam 40 is reflected by folding mirrors 42 and incident upon the corresponding second binary diffractive optical elements 18 of the rotating disc 10.

The diffracted beam 40 incident upon the binary diffractive optical element 18 will be larger in cross-section than the incident beam 38 upon the binary diffractive optical element 14. However, the radius of the second ring 16 is larger than the radius of the first ring. The binary diffractive optical element 18 will be larger than its corresponding binary diffractive optical element 14. So, the binary diffractive optical element 18 is still underfilled in that the incident beam (40)'s cross-section is considerably smaller than the larger binary diffractive optical element 18.

The binary diffractive optical element 18 has to be larger than its corresponding binary diffractive optical element 14 since the diffracted beam is moving and not stationary.

The incident light beam typically has a normal or perpendicular angle of incidence to the binary diffractive optical element 18 on the rotating binary diffractive optical element disc. The incident beam can be at the Bragg angle of incidence to reduce loss as the beam strikes the front surface of the rotating binary diffractive optical element disc. The incident beam can, however, have any angle of incidence to the rotating binary diffractive optical element disc.

The rotational movement of the disc relative to the incident light beam produces a scanning beam 26 which sweeps along a scan line 28 determined by incident light beam 40 being diffracted by the binary diffractive optical element 18.

The rotating binary diffractive optical element 18 includes a negative binary diffractive lens element repeated in the sections of the annulus. The lens' effective focal length is a function of the radius, areas nearer the rotor have shorter focal lengths. This variable effective focal length, increasing as the radius of the binary diffractive optical element 18 on the disc increases, is compensated by the stationary conditioning binary diffractive optical element 37. The effect of the three binary diffractive optical elements is to bring the scanning beam to a focus along the scan line. The binary diffractive optical elements act to diffract the incident light beam to a locus of focal points which define the scan line.

The first order diffracted light 26 diffracted by the binary diffractive optical elements 18 will form the scanning beam 26 while the zero order, undiffracted light beam 44 and any undesirable diffraction orders from the binary diffractive optical elements 18 will be blocked by a stop 46.

As shown in FIGS. 3A and 3B, the scanning beam 26 scans across a straight line 28 in the scan (tangential) plane while focussed at a point 52 on the curved surface 54 which is perpendicular to the scanning beam 26. This scan pattern would be a scan line on a photoreceptor drum for example. The surface 44 in the cross-scan (sagittal) plane need not be curved but can be flat or some other shape.

In this embodiment, the first binary diffractive optical element 14 primarily focuses the beam on the scan line while the second binary diffractive optical element 18 primarily scans the beam along the scan line.

The nature of binary diffractive optics technology allows multiple optical functions to be incorporated in each binary diffractive optical element enabling compensation and correction as required.

As shown in FIG. 1, each of the phase levels in the multilevel phase relief structure 20 of the binary diffractive optical element 14 is a diffractive grating with the pitch varying over the entire element. As the element rotates, the multilevel phase relief structure 20 of the binary diffractive optical element moves through an incident light beam and this beam is deflected according to the local pitch, resulting in a scan of the beam. Similarly, each of the phase levels in the multilevel phase relief structure 22 of the binary diffractive optical element 18 is a diffractive grating with the pitch varying over the entire element. As the element rotates, the multilevel phase relief structure 22 of the binary diffractive optical element moves through an incident light beam and this beam is again deflected according to the local pitch, resulting in a scan of the beam. The pitch variation is determined such that scan position on the scan line is a linear function of scanner rotation angle. This double deflection caused by the dual pass through the rotating binary diffractive optical elements doubles the scan angle obtainable by the optical scanning system.

The rotating binary diffractive optical element 18 has a component in the cross-scan (sagittal) plane to remove scan line bow providing a linear scan.

Not all of the optical flux in a light beam is diffracted into the first order beam, the scanning beam 26. A wedge effect is incorporated in the rotating binary diffractive optical element 18 in the cross-scan (sagittal) plane to insure that the first order diffracted beam can be physically and optically separated from the zero order, nondiffracted beam and all undesirable higher order diffraction beams 44.

The zero order, nondiffracted beam 44 and all other unwanted diffraction orders from the binary diffractive optical elements 18 will be blocked by a stop 46. The first order diffracted light 26 diffracted by the binary diffractive optical elements 18 will scan across the scan line 28. Since the blocked zero order beam is along the optical axis and the scanning first order beam is off-axis, the optical scanning system 24 is an off-axis scanning system.

The binary diffractive optical element pattern 22 in each element 18 provides a single scan across the scan line. If the pattern is repeated in each element, the scanning beam repeatedly scans across the scan line.

The spectral dispersion can be compensated by coordinating the positive dispersion of the glass collimating lens 36 with the negative dispersion inherent in binary diffractive optical elements 14 and 18.

The rotating binary diffractive optical elements 18 need not be a negative optical element but can instead, be a positive element. A positive element would work with a positive binary diffractive optical element 14 to achieve focussing and scanning of the incident beam.

It is not necessary that the scan pattern produced by the rotating binary diffractive optical element optical scanning system be a scan line. The scan pattern produced by this optical scanner could be another open pattern such as a zig-zag or a closed pattern such as a circle, a figure-8 or a diamond.

However, the nature of binary diffractive optics technology allows multiple optical functions to be incorporated in each binary diffractive optical element.

In the first embodiment, the first binary diffractive optical element 14 primarily focuses the beam on the scan line while the second binary diffractive optical element 18 primarily scans the beam along the scan line. Alternately, since the nature of binary diffractive optics technology allows multiple optical functions to be incorporated in each binary diffractive optical element, with the same optical elements in the structure and the same optical path, a portion of the focussing function can be done by the second binary diffractive optical element 18 and a portion of the scanning function can be done by the first binary diffractive optical element 14.

Alternately, the second diffraction order beam can be the scanning beam along the scan line since there is a double diffraction of the light beam through the two rotating binary diffractive optical elements. When the optical scanning system utilized a second diffraction order beam, the scan angle will be doubled. Thus, a dual pass optical scanning system with a second order diffraction beam as the scanning beam will quadruple the scanning angle.

The quadrupling of the scan angle is important in two respects. First, it increases the scan angle and width of the scan line. Second, it allows the multilevel phase relief structure of the binary diffractive optical element to be fabricated at a four times reduced resolution and still achieve the same scan angle and scanning performance. This reduced need for precision and tighter fabrication tolerances will make the manufacture of the binary diffraction optical elements easier, cheaper and quicker by reducing the number of masking and etching steps to form the phase levels.

A roof prism could be substituted for the folding mirrors to redirect the beam from the first binary diffractive optical element to the second binary diffractive optical element.

The primary advantages of the rotating binary diffractive optical element scanner is the low cost and small size resulting from the reduced number of optical components compared to a typical rotating polygon mirror or hologram scanner. Net optical throughput is improved as a result of fewer optical elements.

An additional advantage results from the use of a thin circular disc rather than a thicker polygon mirror structure as the rotating element. Acoustic noise is significantly reduced as well as drive power and bearing load. Higher rotational speed is possible.

Unlike a holographic scanner, the scanning optics are included in the rotating element with the binary diffractive optical element. As a result of the lack of optics beyond the scanner, the over all size is reduced significantly relative to a typical rotating polygon mirror scanner or a holographic scanner, both of which must incorporate optics beyond the scanning element to scan a light beam along a scan line.

Since the scanning element is a transmissive disc having parallel plane faces, this structure when rotated provides a natural resistance to bearing wobble and shaft mounting errors.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanner for scanning a light beam along a scan line comprising:
   a light source for emitting a coherent light beam,
   means to collimate said coherent light beam,
   a first stationary binary diffractive optical element to condition said collimated light beam at said scan line,
   a rotating disc with a first plurality of binary diffractive optical elements and a second plurality of binary diffractive optical elements, said first plurality of binary diffractive optical elements diffracting said collimated, conditioned light beam to focus said light beam at said scan line, and
   reflecting means to direct said light beam from said first plurality of binary diffractive optical elements to said second plurality of binary diffractive optical elements, said second plurality of binary diffractive optical elements diffracting said reflected light beam to scan said light beam along said scan line.

2. The optical scanner for scanning a light beam along a scan line of claim 1 wherein said diffracted beam to scan along said scan line is the first order diffracted beam.

3. The optical scanner for scanning a light beam along a scan line of claim 2 wherein said plurality of second binary diffractive optical elements have an optical wedge effect to separate said first order diffracted beam from a zero order, nondiffracted beam and undesirable higher diffraction orders.

4. The optical scanner for scanning a light beam along a scan line of claim 1 wherein said diffracted beam to scan along said scan line is the second order diffracted beam.

5. The optical scanner for scanning a light beam along a scan line of claim 1 further comprising
   means to block light from said second plurality of binary diffractive optical elements which is not diffracted to scan along said scan line.

6. The optical scanner for scanning a light beam along a scan line of claim 1 wherein said second plurality of binary diffractive optical elements are negative elements.

7. The optical scanner for scanning a light beam along a scan line of claim 1 wherein said second plurality of binary diffractive optical elements are positive elements.

8. The optical scanner for scanning a light beam along a scan line of claim 1 wherein a multilevel phase relief structure of said first plurality of binary diffractive optical elements and a multilevel phase relief structure of said second plurality of binary diffractive optical elements are along a radius of said rotating disc to diffract said light beam along said scan line.

9. An optical scanner for scanning a light beam along a scan line comprising:
   a light source for emitting a coherent light beam,
   means to collimate said coherent light beam,
   a first stationary binary diffractive optical element to condition said collimated light beam at said scan line,
   a rotating disc with a first plurality of binary diffractive optical elements and a second plurality of binary diffractive optical elements, said first plurality of binary diffractive optical elements diffracting said collimated, conditioned light beam to focus and scan said light beam at said scan line, and
   reflecting means to direct said light beam from said first plurality of binary diffractive optical elements to said second plurality of binary diffractive optical elements, said second plurality of binary diffractive optical elements diffracting said reflected light beam to scan and focus said light beam along said scan line.

10. The optical scanner for scanning a light beam along a scan line of claim 9 wherein said diffracted beam to scan along said scan line is the first order diffracted beam.

11. The optical scanner for scanning a light beam along a scan line of claim 10 wherein said plurality of second binary diffractive optical elements have an optical wedge effect to separate said first order diffracted beam from a zero order, nondiffracted beam and undesirable higher diffraction orders.

12. The optical scanner for scanning a light beam along a scan line of claim 9 wherein said diffracted beam to scan along said scan line is the second order diffracted beam.

13. The optical scanner for scanning a light beam along a scan line of claim 9 further comprising
   means to block light from said second plurality of binary diffractive optical elements which is not diffracted to scan along said scan line.

14. The optical scanner for scanning a light beam along a scan line of claim 9 wherein said second plurality of binary diffractive optical elements are negative elements.

15. The optical scanner for scanning a light beam along a scan line of claim 9 wherein said second plurality of binary diffractive optical elements are positive elements.

16. The optical scanner for scanning a light beam along a scan line of claim 9 wherein a multilevel phase relief structure of said first plurality of binary diffractive optical elements and a multilevel phase relief structure of said second plurality of binary diffractive optical elements are along a radius of said rotating disc to diffract said light beam along said scan line.

* * * * *